US005476828A

United States Patent [19]
Kapteijn et al.

[11] Patent Number: 5,476,828
[45] Date of Patent: Dec. 19, 1995

[54] CATALYST AND CATALYTIC REDUCTION

[75] Inventors: Freek Kapteijn; Lydia Singoredjo, both of Amsterdam, Netherlands

[73] Assignee: British Technology Group Limited, London, United Kingdom

[21] Appl. No.: 190,051

[22] PCT Filed: Jul. 17, 1992

[86] PCT No.: PCT/GB92/01312

§ 371 Date: Apr. 14, 1994

§ 102(e) Date: Apr. 14, 1994

[87] PCT Pub. No.: WO93/02776

PCT Pub. Date: Feb. 18, 1993

[30] Foreign Application Priority Data

Jul. 29, 1991 [EP] European Pat. Off. .............. 91306928

[51] Int. Cl.$^6$ ..................................................... B01J 23/34
[52] U.S. Cl. ........................... 502/324; 502/305; 502/350; 423/239.1
[58] Field of Search ....................... 502/305, 324, 502/350; 423/239.1

[56] References Cited

U.S. PATENT DOCUMENTS 4,003,854  1/1977  Skvortsov et al. ...................... 252/471
4,966,882  10/1990  Kato et al. .............................. 502/350

FOREIGN PATENT DOCUMENTS 0256590  2/1988  European Pat. Off. .
2393602  6/1978  France .
0279172  1/1982  United Kingdom .

Primary Examiner—Gary P. Straub
Assistant Examiner—Thomas G. Dunn, Jr.
Attorney, Agent, or Firm—Nixon & Vanderhye

[57] ABSTRACT

A catalyst for the selective reduction of nitric oxide NO in flue gas to nitrogen using ammonia $NH_3$ comprises oxidatively heat treated manganese oxide loaded on a porous substrate of gamma-alumina or titania- or titania-/$WO_3$-modified silica.

16 Claims, No Drawings

CATALYST AND CATALYTIC REDUCTION

This invention relates to a catalyst comprising a metal on a porous support, and to a method of making such a catalyst. The invention also relates to a method of reduction using the catalyst.

BACKGROUND OF THE INVENTION

The natural gas industry has long sought a way in the presence of excess oxygen of removing oxides of nitrogen from flue gas, which may typically be at 375–425 K and may contain 13–14 volume % water vapor, 5–6% oxygen, 6–7% carbon dioxide and 100 ppm nitric oxide. Oxides of nitrogen can also arise in flue gas in other industries where combustion occurs and in petrol motor car exhausts. It is desirable to convert these compounds into harmless compounds before they are released into the atmosphere.

EP-B-256590 discloses a titanium/vanadium catalyst on a silica carrier for reducing nitrogen oxides in the presence of ammonia to nitrogen and water. This is stated in the EP-B to be only 64% effective at 423 K even at a gas hourly space velocity (explained later) of 10000, which is too low a throughput for some large-scale industries.

Further catalysts for this reaction are disclosed in Catalysis Today 7 (1990) 157–165, (copper salts on carbon supports), Ind Eng Chem Prod Res Dev 20 (1981) 301–304 (molybdenum on titania/zirconia/alumina/silica, International Chemical Engineering 15 (July 1975) 546–549 (Pt, $CuO$—$Cr_2O_3$, $CuO$, $V_2O_5$, $NiO$, $Fe_2O_3$, $MnO$—$Cr_2O_3$, $MoO_3$, $Co_3O_4$, $MnO_2$, $Cr_2O_3$ and $WO_3$), and Bulletin of Chemical Society of Japan 54 (1981) 3347–3350 ($Mn_2O_3$ and $Mn_2O_3$—$Co_3O_4$ in 1 mm particles from calcined carbonate-precipitated nitrate solution), the last-named suffering from slow partially irreversible poisoning by sulphur dioxide.

Wakker and Gerritsen, Proc American Chemical Society, Division of Fuel Chemistry 35(1) (1990) 170 discloses a catalyst of MnO supported on gamma-alumina, the MnO being obtained by impregnating the alumina in manganese acetate, sulphate, nitrate or oxalate solution, drying, optionally calcining, and reducing with hydrogen at 600° C. This catalyst can remove $H_2S$ from hot reactor gases. However, it cannot reduce oxides of nitrogen.

A similar catalyst (manganese acetate or nitrate solution impregnated into steam-activated carbonised peat and calcined in 2% oxygen) was disclosed for reducing NO with ammonia at the International Symposium on Carbon, TsuKuba, 1990, page 590 of the Extended Abstracts. This catalyst can successfully reduce NO below 425 K but its activity decreases irreversibly above that temperature. This is a serious problem since it cannot be guaranteed that the temperature of a flue in an industrial process (such as petrochemical cracking) will not accidentally rise above 425 K.

DESCRIPTION OF THE INVENTION

According to the present invention, a process of preparing a catalyst for the reduction of nitrogen oxide comprises applying a manganese compound in solution to a porous carrier, removing the solvent, and subjecting the carrier (including the manganese compound) to a heat treatment at from 550 K to 850 K characterised in that said heat treatment tends to oxidise Mn(II) and in that the porous carrier is inorganic. The heat treatment is preferably in the presence of at least 0.01 or 0.03 atmospheres oxygen, more preferably at least 0.05 atmospheres, for example at least 0.1 atmospheres. The oxygen presence is most conveniently the air, or may be ½ atmosphere or more, such as pure oxygen.

The heat treatment may be performed at from 720 K, more preferably from 750 K, and preferably at up to 830 K, more preferably up to 800 K. The preferred duration of the heat treatment depends on the temperature, as follows:

550–625 K: 12 to 48 hours, preferably 18 to 36 hours
625–720 K: 4 to 18 hours, preferably 6 to 12 hours
20–830 K: 1½ to 6 hours, preferably 2 to 4 hours.

The upper time limits may be exceeded but there is no advantage. Beforehand, if proceeding above 625 K, it preferably takes at least 1 hour from passing 525 K to passing 625 K.

The porous inorganic carrier, which preferably comprises silica or alumina or both, may be loaded with titanium dioxide or tungsten trioxide or both, before or at the same time as or after applying the manganese compound, and the tungsten trioxide may be applied in the form of a tungstate, preferably in solution, preferably of ammonium. If $TiO_2$ is used as the support, tungsten and manganese compounds may be added in either order or simultaneously.

The preferred use of the catalyst made in this way is to reduce nitrogen oxide in the presence of oxygen, using a compound containing N and H such as ammonia, preferably at up to 475 K. For applications where ammonia is not practical, such as motor cars, a solid compound may be used, preferably containing amine groups, e.g. urea $(NH_2)_2C=O$.

EXAMPLES

The invention will now be described by way of example.

A catalyst was synthesised for the selective catalytic reduction of nitric oxide NO in stack or flue gases at low temperatures (100°–200° C.). The reduction is effected with ammonia $NH_3$ and proceeds thus: $4NO+4NH_3+O_2 \rightarrow 4N_2 + 6H_2O$. Also nitrogen dioxide $NO_2$ is in principle able to be reduced to environmentally innocuous nitrogen and water by a corresponding reaction, but consuming less elemental oxygen.

The catalyst was based on manganese oxide on a porous inorganic particulate support, and was made as follows:

The support used in series A of the examples was $\gamma$-$Al_2O_3$, in series B=$SiO_2$, C=$TiO_2$, and D=$SiO_2$—$Al_2O_3$. The $\gamma$-$Al_2O_3$ had a BET surface area of 200 $m^2/g$, a $V_p$ of 0.5 $cm^3/g$ and a $d_p$ of 210–250 μm.

The support could be modified by loading or covering its internal surface (i.e. its pores) and its external surface with a highly dispersed modifier in as near as possible monolayer form, or quarter-monolayer, or up to 10% by weight. The modifier is designated in the examples thus:

0: no modifier
1: $TiO_2$
2: $WO_3$

Examples AO thus refer to an unmodified γ-alumina support, and Examples B1 to a silica support loaded with $TiO_2$, in that case 10% by weight of $TiO_2$. The $WO_3$ was applied by decomposing ammonium tungstate in situ and ammounted to 6 weight %. Both could be present together. Heavier and lighter loadings of modifier may also be used.

The manganese oxide was applied by stirring the support (which had been dried for 24 hours at 393 K) in a near-saturated (or, if desired, less concentrated) precursor solution demineralised water or any other solvent not leaving undesirable residues) of a manganese salt or complex. This could be inorganic, e.g.

(i) manganous nitrate $Mn(NO_3)_2$ or organic, e.g.

(ii) manganous acetate $Mn(CH_3COO)_2$, (iii) manganous oxalate, (iv) manganese-EDTA complex or (v) for the Mn-W combination catalyst, a mixture of (ii)+ammonium tungstate $(NH_4)_6H_2W_{12}O_{40}$, used in that order (see below)

Examples AOi thus refer to an unmodified γ-alumina support on which manganese oxide was deposited derived from manganous nitrate precursor.

The volume of the precursor solution was equal to the volume of the pores in the support. The precursor solution was allowed to fill the pore volume of the support by the so-called "pore volume impregnation" or "incipient wetness" method. Solvent was removed (in the case of water) by allowing to dry at room temperature overnight (24 hours was used in case (v) above), then raising to 50° C. for 2 hours, then 60° C. for 2 hours, then 70° C. for 2 hours, then 85° C. (about 360 K) overnight.

The procedure was repeated as often as necessary to achieve the desired manganese loading of the support. A less concentrated solution of precursor could be sufficient if a less heavy manganese loading is desired; for the same loading, correspondingly more repetitions of the impregnation-plus-solvent-removal would be needed.

Alternatively, a dry procedure performed directly at 85°–100° C. could be sufficient.

The sample was then calcined by heating it in air or oxygen (no differences found) at 4 K/min to 575 K (300° C.), held for 1 hour to allow the salts/complexes to decompose to oxide, heated further at 4 K/min to 775 K and held for 3 hours. Instead of 775 K, 725 K could be used at the cost of incomplete calcination (which would lower the catalytic activity) and 830 K could be used but at the cost of a diminished catalytic activity caused by vapor-phase loss of manganese or thermal transformation of catalytically active phase into a less active one. The 3 hours could be extended to e.g. 24 hours but it made no difference. After slow cooling to room temperature, the sample was ready for use. This procedure, according to the number of impregnations with the precursor, yielded loadings of 3.3% Mn (calculated as the metal) by weight, 8.3% and 15.5%. These are designated in the examples as AOi3.3 etc.

For case (v), these operations are followed by impregnating with the ammonium tungstate solution, with again drying and calcining as described above.

In more genera) terms, where a modifier is present, it could either be calcined before the addition of manganese precursor or could be merely dried, or vice versa, i.e. add manganese precursor first, then dry and optionally calcine, then add modifier, dry and calcine.

The kind of active phase present on the catalyst due to the oxidative thermal treatment of the catalyst can be sensitively detected using thermal programmed reduction, which yields distinctive "signatures", representing the several reduction steps of the metal oxide on the support.

The catalysts were then tested on a gas stream flowing at a rate of 60 liters (STP equivalent) of gas per gram of catalyst-including-support per hour, in other words a volume hourly space velocity of $54000h^{-1}$, otherwise equivalent to 54000 changes per hour, the gas stream being of composition 500 ppm NO, 550 ppm $NH_3$, 2% $O_2$ and balance helium.

Catalyst AOii achieved over 95% conversion of the NO to $N_2$ at 425 K with minimal $N_2O$ byproduct over a 200-hour test. The latter finding is valuable since the catalyst will not decompose $N_2O$ with ammonia. Above 475 K, the catalyst started to oxidise the ammonia, with undesirable production of NO (counterproductive) and $N_2O$ (nuisance). Above 300° C. the catalyst is not recommended because of the possible decreasing selectivity towards $N_2$. The catalyst was selective towards NO reduction; in particular, it did not catalyse the reduction of other flue gases such as $CO_2$.

The $N_2$, and the $N_2O$ which is sometimes observed, have been proved to arise from the reaction $N^1O+N^2H_3+oxygen \rightarrow N^1N^2$ or $N^1N^2O+water$, i.e. not solely from the oxidation of ammonia but jointly from the NO. The formation of $N_2O$ can be almost eliminated by $WO_3$-loading of a gamma-aluminia catalyst support (Examples A2×n), and can be lessened (with an accompanying gain in percentage removal of NO) by 10% $TiO_2$-loading of a silica catalyst support (Examples B1×n). It can also be lessened by diminishing the amount of manganese catalyst used, but this may be undesirable especially in cleaning damp flue gas.

Certain combinations of support and precursor yielded especially active and selective catalysts, such as (B/C/) (i), and (A/D) (ii/iii/iv). Especially preferred were Examples A.ii8.4, B(1+2)ii8.4 (at higher temperatures, e.g. 540–560 K) and BOi8.4.

Exposure to sulphur dioxide, in particular 2% $SO_2$ at 525 K, tends to deactivate the catalysts, but Example series A survived best. Exposure to water inhibits the catalyst but this effect can be compensated by increasing the amount of manganese or using a lower volume hourly space velocity (which might however be industrially undesirable).

Example Blii8.4 removed 80% of NO at 400 K and 100% in the range 440–475 K, and still removed over 95% at 563 K. Example B(1+2)ii8.4 achieved 100% removal in the range 525–575 K.

Example AOii8.4 has achieved 95% conversion of NO continuously for 200 hours, and can do so over the wide temperature range 425–525 K, which simplifies process control. Example AOi8.4 can achieve 97% or better around 475–525 K but falls away more sharply outside this range.

Varying the manganese loading while keeping all other conditions constant had little effect up to 500 K, but at 575 K the 3.3 weight % catalyst was still achieving 97% NO conversion (same as 500 K) while the 8.4% and 15.5% catalysts had fallen to 90% conversion.

Examples DO×8.4 were superior at all temperatures to Examples D2×8.4.

A survey of Examples AOv is given in Table 1. The catalysts are designated by the number of metal atoms per $nm^2$ of initial support area. For the sake of clarity the weight content of the metal oxide is also included in Table 1.

TABLE 1

| Metal oxide | Weight content (%) | |
|---|---|---|
| (metal atoms/nm²) | $Mn_2O_3$ | $WO_3$ |
| (a) $Mn_2O_3(1.86)$ | 4.7 | — |
| (b) $Mn_2O_3(5.00)$ | 11.6 | — |
| (c) $Mn_2O_3(10.00)$ | 20.8 | — |
| (d) $Mn_2O_3(5.00)$—$WO_3(1.07)$ | 10.8 | 6.8 |
| (e) $WO_3(1.42)$ | — | 9.8 |

Experiment (i) The standard activity measurements on NO conversion were carried out at atmospheric pressure, using 50 mg of catalyst and between 385 K and 575 K at a volume hourly space velocity of $58.000\ h^{-1}$. The reactor feed contained 500 ppm NO, 550 ppm $NH_3$, 2 vol % $O_2$ and He as balance. The volume hourly space velocity was doubled for (c) and lessened for (a) so that VHSV/Mn was constant.

Experiment (ii) To investigate the effect of $H_2O$ on the NO conversion some experiments have been carried out with addition of $H_2O$ at 435 K at a volume hourly space velocity of 31.000 $h^{-1}$. In this case the reaction mixture had the following composition: 525 ppm NO, 550 ppm $NH_3$, 2.5 vol % $O_2$, with either 0, 4.6 or 8.7 vol % $H_2O$ and Ar as balance. Sample (c) was used for this experiment.

Experiment (iii) A long run experiment of 600 h at 425 K under standard conditions has been carried out. In some of the experiments $^{15}NH_3$ was employed to trace the origin of both N atoms in the reaction products.

Experiment (iv) Sulfatation of the samples has been performed in a thermobalance by using an air flow, containing 2000 ppm $SO_2$. The sulfatation procedure starts with drying the sample at 425 K in air, after which the temperature is decreased to 325 K. Then the sulfatation of the sample starts, while the temperature is increased at a rate of 5 $K.min^{-1}$ to 475 K. At this final temperature sulfatation is continued for 15 minutes, after which the catalysts have been tested at 425 K under the standard experimental conditions.

The results of Experiment (i) on the catalysts from Table 1 show that sample (e) hardly exhibits any NO reduction activity, having a comparable activity as the $\gamma$-$Al_2O_3$ support, (d) being slightly inferior. Differences in NO conversions between the other catalysts are only observable below 475 K. In the higher temperature region no differences can be discerned, all the NO conversions being 95–100% but decreasing above 525 K.

Besides $N_2$ formation from the NO, less desirable $N_2O$ formation has been observed above 425 for all the catalysts of Table 1, but by far the least $N_2O$ arose from (d), and the most from the most Mn-rich catalysts.

Experiment (ii) yielded the following results: NO conversion:=98% (no $H_2O$);=67% (4.6 vol % $H_2O$);=47% (8.7 vol % $H_2O$). $H_2O$ reversibly inhibits the reaction, since upon removing the $H_2O$ the NO conversion returns within a few minutes to the original higher value.

In Experiment (iv) on sample (b), the NO conversion decreases from 95% to 85% after the sulfatation procedure. So it can be concluded that sample (b) still retains a high (85%) activity, even after being subjected to 2000 ppm $SO_2$ in air.

Experiment (iii) on sample (b) demonstrates that this catalyst exhibits a highly stable activity (about 94% NO conversion) after approximately 150 h.

Sample (d) already operates at 325 K. Ammonia was adsorbed first, catalyst was flushed to remove gaseous residual ammonia, and a mixture of NO and oxygen was passed over the catalyst. This resulted in the instantaneous formation of $N_2$ due to the reaction between NO and ammonia at 50° C. The presence of oxygen is needed, otherwise the temperature has to be raised to above 100° C. Generally speaking, the reaction rate is zero order in ammonia, and 0.4 order in NO and also in oxygen. Nitrous oxide ($N_2O$) was not observed in this type of experiment.

This opens up applications in systems whereby the catalyst is first loaded with ammonia, and then exposed to the NO-containing atmosphere. This separately loading and reacting may avoid the escape of ammonia to the environment, an important issue in this type of catalysis.

Experiments with catalysts loaded with 1 and 2 wt % Mn on alumina confirmed that these are as active per unit of Mn and selective as the 3 wt % Mn catalyst.

We claim:

1. Process for preparing a catalyst for the reduction of nitrogen oxide, said process consisting essentially of the steps of:

applying a solution consisting of a manganese organic salt in a solvent to a porous inorganic carrier of gamma alumina;

removing said solvent;

subjecting said carrier to a heat treatment which oxidizes Mn(II), said heat treatment including at least one of the heating steps selected from the group consisting of:

from 275° to 350° C. for at least 12 hours, from 350° to 455° C. for at least 4 hours, and from 455° to 555° C. for at least 1½ hours.

2. Process according to claim 1, wherein the manganese organic salt is a carboxylate.

3. Process according to claim 2, wherein the carboxylate is acetate or oxalate.

4. Process according to claim 1, wherein the Mn is oxidized by oxygen which is present in air.

5. Process according to claim 1, wherein the heat treatment is in the presence of at least 0.03 atmosphere oxygen.

6. Process according to claim 1, wherein the heat treatment is at 455° to 555° C.

7. Process according to claim 6, wherein the heat treatment is at 475° to 525° C.

8. Process according to claim 1, wherein the heat treatment is conducted at:

from 275° to 350° C. for about 18–36 hours; or from 350° to 455° C. for about 6–12 hours; or from 455° to 555° C. for about 2–4 hours.

9. Process for preparing a catalyst for the reduction of nitrogen oxide, said process consisting essentially of the steps of:

applying a solution consisting of a manganese organic salt in a solvent to a porous inorgangic carrier of gamma alumina;

removing said solvent;

subjecting said carrier to a heat treatment by heating from 250° C. to above 350° C. to oxidize Mn(II) with oxygen, said heat treatment being carried out such that at least 1 hour elapses from passing 250° C. to passing 350° C.

10. Process for preparing a catalyst for the reduction of nitrogen oxide, said process consisting essentially of the steps of:

applying a solution consisting of a manganese (II) compound in a solvent to a porous inorganic carrier of gamma alumina;

removing said solvent; and subjecting said carrier to a heat treatment by heating from 250° C. to above 350° C. to oxidize Mn (II) with oxygen, said heat treatment being carried out at a temperature which does not exceed 575° C. and such that at least one hour elapses from passing 250° C. to passing 350° C.

11. Process according to claim 10, wherein the heat treatment is conducted at:

from 275° to 350° C. for at least 12 hours; or from 350° to 455° C. for at least 4 hours; or from 455° to 555° C. for at least 1½ hours.

12. Process according to claim 10, wherein the manganese compound is a nitrate, acetate, oxalate or EDTA complex.

13. Process for preparing a catalyst for the reduction of nitrogen oxide, said process consisting essentially of the steps of:

applying a solution consisting of a manganese organic salt in a solvent to a porous inorganic carrier of gamma alumina;

removing said solvent;

subjecting said carrier to a heat treatment which oxidizes Mn (II), said heat treatment including at least one of the heating steps selected from the group consisting of:

from 275° to 350° C. for about 12–48 hours, from 350° to 455° C. for about 4 to 18 hours, and from 455° to 555° C. for about 1½ to 6 hours.

14. Process for preparing a catalyst for the reduction of nitrogen oxide, said process consisting essentially of the steps of:

applying a solution consisting of a manganese (II) compound in a solvent to a porous inorganic carrier of gamma alumina;

loading the carrier with titanium dioxide or with tungsten trioxide or with both before or after but not at the same time as applying the manganese (II) compound;

removing the solvent;

subjecting the carrier to a heat treatment by heating from 250° C. to above 350° C. to oxidize Mn (II) with oxygen, said heat treatment being carried out such that at least one hour elapses from passing 250° C. to passing 350° C.

15. Process according to claim 14, wherein the tungsten trioxide is applied in the form of a tungstate which is decomposed in situ.

16. Process according to claim 15, wherein the tungstate is an ammonium tungstate solution.

* * * * *